United States Patent [19]

Kuroda et al.

[11] 4,320,871
[45] Mar. 23, 1982

[54] BIMETALLIC COLUMN

[75] Inventors: Masatomo Kuroda, Suita; Masahumi Minami, Sakai, both of Japan

[73] Assignee: Miyazwaki Steam Trap Mfg. Co., Ltd., Osaka, Japan

[21] Appl. No.: 101,384

[22] Filed: Dec. 7, 1979

[30] Foreign Application Priority Data

Dec. 14, 1978 [JP] Japan ............... 53-154671

[51] Int. Cl.³ .............................. F16T 1/08
[52] U.S. Cl. ................... 236/59; 73/363.1; 236/101 B
[58] Field of Search .............. 236/59, 101 B; 73/363.3, 363.1; 137/183; 251/318

[56] References Cited

U.S. PATENT DOCUMENTS 1,219,515  3/1917  Whittelsey ............... 73/363.1 X
1,231,044  6/1917  Mayer ....................... 236/59
3,169,704  2/1965  Domm et al. .............. 236/59
3,220,650  11/1965 Deeks ....................... 236/59
3,985,296  10/1976 Fujiwara ................... 236/59
4,060,193  11/1977 Foller ....................... 236/59

FOREIGN PATENT DOCUMENTS 1099550  2/1961  Fed. Rep. of Germany ........ 236/59

Primary Examiner—William E. Tapolcai, Jr.
Attorney, Agent, or Firm—Sughrue, Mion, Zinn, Macpeak and Seas

[57] ABSTRACT

A bimetallic column for temperature detection operating devices such as a steam trap, comprising a guide tube secured at its one portion to a counter part of a control stem and slidably extending through a center hole of the bimetallic column and projecting out of the bimetallic column, the control stem slidably extending through the guide tube.

5 Claims, 9 Drawing Figures

4,320,871

BIMETALLIC COLUMN

BACKGROUND OF THE INVENTION

1. Field of the Invention

This invention relates to a bimetallic column for temperature detection operating devices such as a steam trap that automatically obstructs the passage of hot steam but permits the escape of cold condensate in response to the temperature difference between the steam and condensate.

2. Description of the Prior Art

Such a bimetallic column is composed of a plurality of pairs of bimetallic discs superimposed one upon the other. Each pair is spaced apart from an adjacent pair by a spacer and is composed of two opposed bimetallic discs each formed of two different metal or alloy discs bonded together into one integral body. One of the two discs has a high thermal expansion coefficient while the other disc has a low thermal expansion coefficient. In each pair, the metallic discs which are the same in polarity, that is, the same in the thermal expansion coefficient or at least the metallic discs those tend to thermally expand in the same manner are opposed with each other.

The bimetallic column constructed as above described is sensitive to heat and displaced by elongation and hence if it is applied to a steam trap, for example, it is possible to lift a valve stem and hence a valve head from a valve seat. It can be utilized to control the escape of the condensate as above described.

The bimetallic column applied to the steam trap is provided at its center with a hole having a diameter which is slightly larger than an outer diameter of a valve stem extending through the center hole. As a result, if each pair of bimetallic discs are sensitive to heat and deformed, several forces are subjected thereto that tend to incline the valve stem with respect to the bimetallic column and hence urge the valve head against the valve seat, thereby increasing frictional resistance therebetween and restraining the displacement of the bimetallic column and preventing a smooth lift movement of the valve head. In addition, the flow of condensate tends to incline the valve stem to increase sliding resistance to the bimetallic column.

SUMMARY OF THE INVENTION

An object of the invention, therefore, is to provide a bimetallic column for temperature detection operating devices, for example, a steam trap, which is simple in construction and which can eliminate the above mentioned drawbacks in a reliable manner.

A feature of the invention is the provision in a bimetallic column comprising a plurality of pairs of bimetallic discs superimposed one upon the other and each having a center hole, each pair being separated from adjacent pair by a spacer and having two opposed bimetallic discs each composed of two different metal or alloy discs bonded together. In each pair, the opposed discs are the same in thermal expansion coefficient, the center hole of the bimetallic column being slidably engaged with a stem of a temperature detection operating device connected at its one end to one end of the bimetallic column having the other end supported by a counter part of the valve seat. The improvement comprises a guide tube secured at its one portion to the counter part and slidably extending through the center hole of the bimetallic column, and projecting out of the bimetallic column, the stem slidably extending through the guide tube.

Further objects and features of the invention will be fully understood from the following detailed description with reference to the accompanying drawings, wherein:

DETAILED DESCRIPTION OF THE PREFERRED EMBODIMENT

Figure 1:
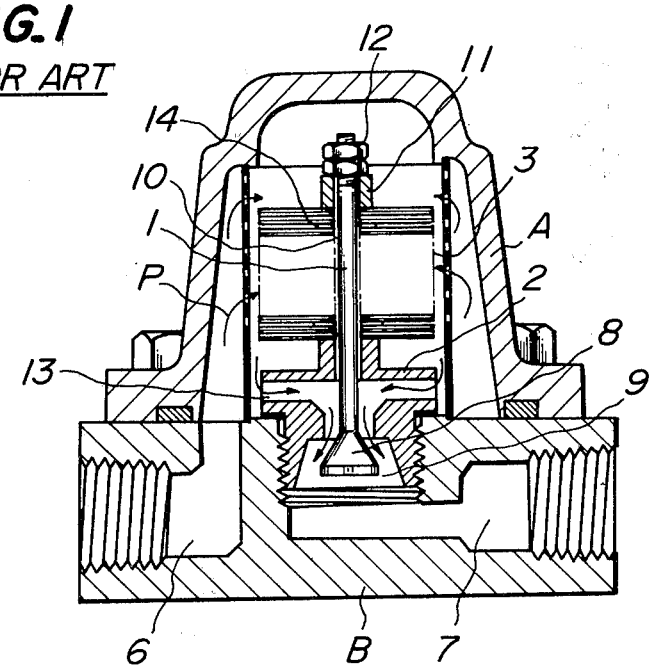
FIG. 1 is a longitudinal sectional view of a conventional bimetallic column for a steam trap interposed between two horizontal pipes.
Figure 2:
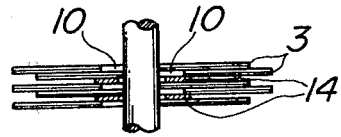
FIG. 2 is a partial cross-sectional view of the bimetallic column shown in FIG. 1.

In FIG. 1 showing a conventional bimetallic column for a steam trap, a valve stem 1 is extended through a valve seat 2 and slidably supported by it. Between an upper end portion of the valve stem 1 and the valve seat 2 is interposed a bimetallic column 3 having a center hole 10 slidably engaged with the valve stem 1.

In the steam trap comprising two casing bodies A, B shown in FIG. 1, a low temperature condensate entering into an inlet passage 6 provided in the casing body B flows in a direction shown by an arrow P and through a transverse hole 13 arrives at a valve head 8 and then passes through a valve opening 9 and is finally exhausted from an outlet passage 7.

Figure 3:
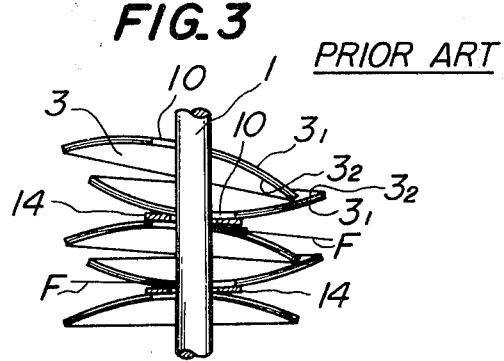
FIG. 3 is a partial cross-sectional view of the bimetallic column shown in FIG. 1 in its expanded condition.

As a result, the condensate at the upper stream thereof makes contact with hot steam and becomes high in temperature. If such high temperature condensate makes contact with the bimetallic column 3, the metallic column 3 becomes deformed as shown in FIG. 3 and hence is displaced to raise up the valve stem 1 and valve head 8 and close the valve opening 9.

The bimetallic column 3 comprises a plurality of pairs of bimetallic discs superimposed one upon the other and each pair is separated from adjacent pair by a spacer 14. Each pair comprises two opposed bimetallic discs each composed of two different metal or alloy discs $3_1$, $3_2$ bonded together. In each pair, the opposed discs $3_2$, $3_2$ are the same in thermal expansion coefficient, in the present embodiment, are small in thermal expansion coefficient, the other discs $3_1$, $3_1$ each having a large thermal expansion coefficient.

Each disc is provided at its center with the hole 10 which is slightly larger than the outer diameter of the valve stem 1. If each disc is snugly fitted with the valve stem 1, the frictional resistance between the center hole 10 of the bimetallic disc $3_1$, $3_2$ and the outer surface of the valve stem 1 functions to prevent the bimetallic column 3 from displacing along the valve stem 1 in response to its thermal expansion, thereby deteriorating the temperature characteristic of the bimetallic column.

Figure 4:
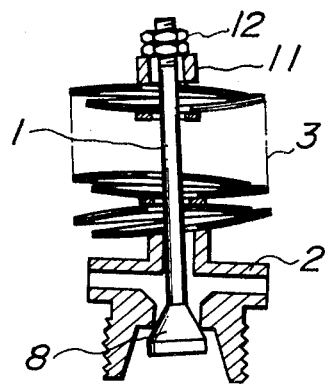
FIG. 4 is a partial cross-sectional view of the bimetallic column shown in FIG. 1 with the valve stem inclined and the valve head urged against the valve seat.
Figure 5:
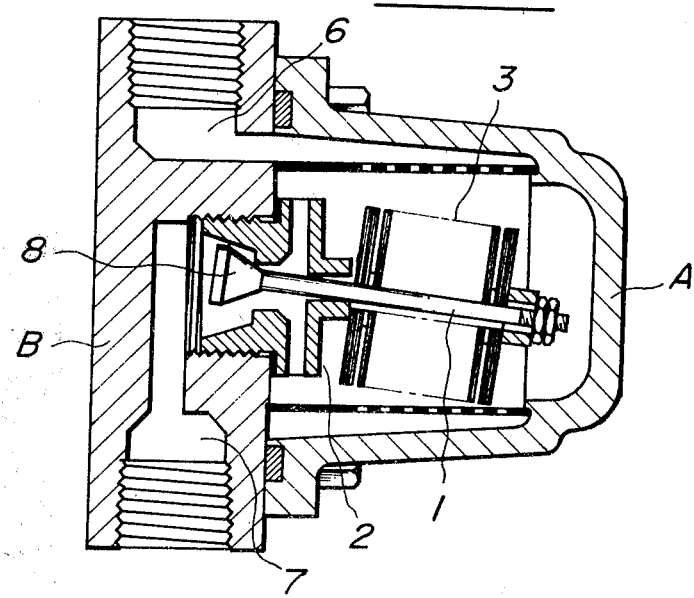
FIG. 5 is a longitudinal sectional view of a conventional bimetallic column for a steam trap interposed between two vertical pipes.

On the contrary, the bimetallic column 3 provided at its center with the hole 10 which is considerably larger than the outer diameter of the valve stem 1 has a number of disadvantages. In the first place, if the two bimetallic discs $3_1$, $3_2$ and $3_1$, $3_2$ of each pair opposed with each other such that the bimetallic disc $3_2$ having a small thermal expansion coefficient is opposed to the bimetallic disc $3_2$ having a small thermal expansion coefficient is thermally expanded as shown in FIG. 3, a couple of forces, F, F are subjected to the opposed bimetallic discs so as to incline the valve stem 1 and hence the valve head 8 as shown in FIG. 4, thereby inducing the frictional resistances for restraining the elongation displacement of the bimetallic column 3. As a result, the smooth lift movement of the valve stem 1 and valve head 8 is degraded. Secondly, one end of the bimetallic column 3 is connected through a ring spacer 11 and set screws 12 to the valve stem 1, so that the condensate flowing into the casing body A as shown by the arrow P causes the bimetallic column 3 to swing about the connected end thereof in an irregular manner. Particularly, a deflecting flow of the condensate entering from the inlet passage 6 and passing through the bimetallic column 3 tends to incline the valve stem 1, and as a result, the valve head 8 is prevented from normally closing the valve opening 9. Third, a flow of the condensate entering from a transverse passage 13 provided in the valve seat 2 and directed toward the outer surface of the valve stem 1 causes the valve stem 1 and hence valve head 8 makes contact with one of the walls of the valve opening 9. Fourth, in a conventional bimetallic column 3 for a steam trap interposed between two vertical pipes 6 and 7 shown in FIG. 5, the weight of the bimetallic column 3 causes the valve stem 1 to incline to urge the valve head 8 against the valve seat 2, thereby producing a considerably large sliding resistance. Finally, all of the above mentioned resistances function to restrain the movement of the bimetallic column 3 and change the operating characteristic of the steam trap. As a result, the amount of displacement per unit temperature difference of the bimetallic column 3 becomes irregular deteriorating the uniformity of the trapping ability of the steam trap.

A feature of the invention is the provision of a bimetallic column for temperature detection operating devices such as a steam trap which is simple in construction and can reliably eliminate all of the above mentioned drawbacks.

Figure 6:
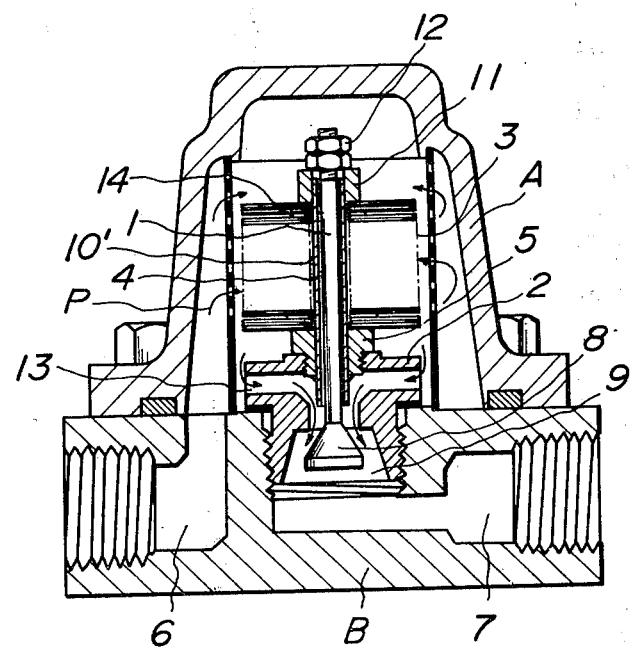
FIG. 6 is a longitudinal sectional view of a bimetallic column for steam traps according to the invention.

In one embodiment of the invention shown in FIG. 6, a valve stem 1 and valve seat 2 are substantially the same in basic construction as those shown in FIG. 1.

In the present embodiment, a bimetallic column 3 is provided at its center with a hole 10' which is made slightly larger than the center hole 10 shown in FIG. 1 and a guide tube 4 is loosely extended through the hole 10' and secured at its lower portion to a valve seat 2, the upper portion of the guide tube 4 projecting out of the bimetallic column 3.

Figure 7:
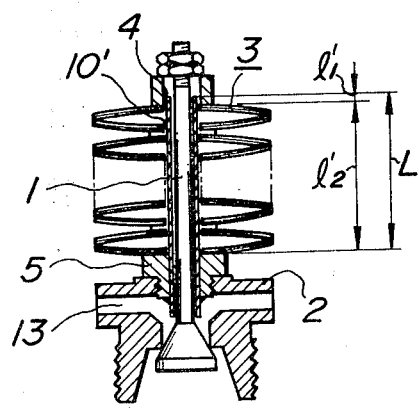
FIG. 7 is a partial cross-sectional view of the bimetallic column shown in FIG. 6 in its expanded condition.

The use of the guide tube 4 secured to the valve seat 2 provides the important advantage that even if respective pairs of the bimetallic column 3 are deformed as shown in FIG. 7, no influence is exerted to the valve stem 1 as shown in FIG. 7.

Figure 9:
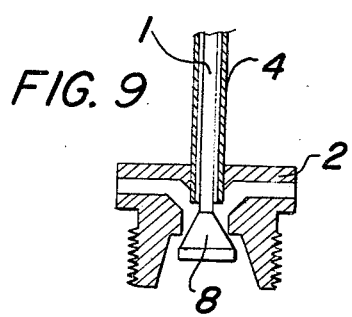
FIG. 9 is a partial cross-sectional view of a modified embodiment of FIG. 6.

In order to secure the guide tube 4 to the valve seat 2 in a simple and positive manner, use may be made of a separate bushing 5 which is secured to the guide tube 4 by welding or soldering and meshed with the valve seat 2. Alternatively, the guide tube 4 may be directly secured to the valve seat 2 as shown in FIG. 9.

In addition, it is preferable to project one end of the guide tube 4 into the transverse passage 13 provided in the valve seat 2 for the purpose of preventing the valve stem 1 from being influenced by a flow of condensate entering into the transverse passage 13.

As shown in FIG. 8, the overall length of the guide tube 4 is made slightly shorter than that of the valve stem 1 and hence functions to slidably guide the valve stem 1 so that there is no risk of the valve stem 1 being inclined by the influence of the condensate entering into the casing body A of the steam trap and sticking against the bimetallic column 3 and any other causes.

Figure 8A:
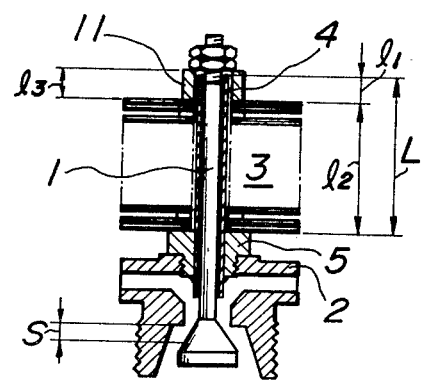
FIG. 8A is a partial cross-sectional view of the bimetallic column shown in FIG. 6 illustrating relations between various constitutional elements.
Figure 8B:
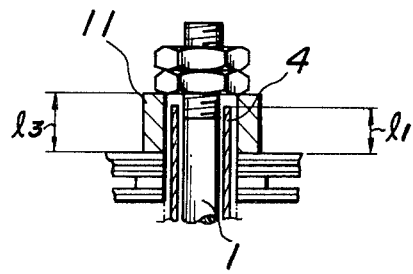
FIG. 8B is its detailed view in an enlarged scale.

As shown in FIGS. 8A and 8B, that portion of the guide tube 4 which is located above the bush 5 has a length L which is longer than the sum of a stroke S of the valve and the overall length $l_2$ of the bimetallic column 3 and given by $$L > S + l_2.$$

That is, that portion of the guide tube 4 which is located above the bimetallic column 3 has a length $l_1$ which is shorter than the overall length $l_3$ of the ring spacer 11 and is at least equal to the stroke S of the valve and given by $$l_3 > l_1 \geq S.$$

In the valve closed position shown in FIG. 7, the overall length $l_2'$ of the expanded bimetallic column 3 is equal to the sum of the stroke S of the valve shown in FIG. 8 and the overall length $l_2$ of the bimetallic column 3 and given by $$l_2' = S + l_2$$

The lengths of the guide tube 4, ring spacer 11 and valve stem 1 are determined as above described.

The bimetallic column according to the invention has been applied to the steam trap. But, the bimetallic column according to the invention may also be applied to any other temperature detecting operating devices such, for example, as a temperature sensitive switch which makes use of bimetallic columns for the purpose of obtaining a large extensive and compressive stroke of a switch arm without inclining or deviating it.

As stated hereinbefore, the bimetallic column according to the invention is capable of smoothly moving a control element irrespective of any influence due to relative transverse displacement produced between opposed bimetallic discs of each pair of the bimetallic column.

What is claimed is:

1. In a bimetallic column comprising a plurality of pairs of bimetallic discs superimposed one upon the other and each having a center hole, each pair being separated from adjacent pair by a spacer and comprising two opposed bimetallic discs each composed of two different metal or alloy discs bonded together and, in each pair, the opposed discs are the same in thermal expansion coefficient, said center hole of said bimetallic column being slidably engaged with a stem of a temperature detection operating device connected at its one end to one end of said bimetallic column having the other end slidably supported by a counter part of a valve seat, the improvement comprising; a guide tube of a unitary construction fixedly secured at its lower portion to said valve seat and slidably extending through said center hole of said bimetallic column and projecting out of said bimetallic column, and said stem slidably extending through said guide tube.

2. The bimetallic column according to claim 1, wherein said guide tube is secured to a separate bushing which is in mesh with said valve seat.

3. The bimetallic column according to claim 1, wherein said guide tube is directly secured to said valve seat.

4. The bimetallic column according to claim 1, wherein the lower end of said guide tube is projected into a transverse passage provided in said valve seat and terminates at a position equal to or lower than the lower end of said transverse passage.

5. The bimetallic column according to claim 1, wherein an overall length of said guide tube is made slightly shorter than that of said valve stem.

* * * * *